United States Patent
Oem et al.

(10) Patent No.: US 10,228,580 B2
(45) Date of Patent: Mar. 12, 2019

(54) TOUCH PANEL

(71) Applicant: LG INNOTEK CO., LTD., Seoul (KR)

(72) Inventors: Seong Su Oem, Seoul (KR); Young Sun You, Seoul (KR); Jin Woong Lee, Seoul (KR); Chung Wan Lee, Seoul (KR); Kwang Yong Jin, Seoul (KR); Yong Jae Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/539,869

(22) PCT Filed: Dec. 28, 2015

(86) PCT No.: PCT/KR2015/014298
§ 371 (c)(1),
(2) Date: Jun. 26, 2017

(87) PCT Pub. No.: WO2016/108531
PCT Pub. Date: Jul. 7, 2016

(65) Prior Publication Data
US 2017/0351131 A1    Dec. 7, 2017

(30) Foreign Application Priority Data
Dec. 30, 2014    (KR) ........................ 10-2014-0193807

(51) Int. Cl.
*G02F 1/1333* (2006.01)
*G06F 3/044* (2006.01)
(Continued)

(52) U.S. Cl.
CPC ........ *G02F 1/13338* (2013.01); *G02F 1/1343* (2013.01); *G06F 3/03545* (2013.01);
(Continued)

(58) Field of Classification Search
None
See application file for complete search history.

(56) References Cited

U.S. PATENT DOCUMENTS 9,877,385 B2 *   1/2018   Nakamura ........... H05K 1/0296
2003/0098858 A1   5/2003   Perski et al.
(Continued)

FOREIGN PATENT DOCUMENTS

JP    2012-0243119    12/2012
KR    10-2013-0108220    10/2013
(Continued)

OTHER PUBLICATIONS

International Search Report (with English Translation) and Written Opinion dated Apr. 12, 2016 issued in Application No. PCT/KR2015/014298.

*Primary Examiner* — Joseph R Haley
(74) *Attorney, Agent, or Firm* — KED & Associates, LLP

(57) ABSTRACT

The present invention relates to a touch panel and, more particularly, to a touch panel comprising: a substrate, which is divided into a valid area and an invalid area; sensing electrodes disposed in the valid area, thereby sensing a first input; touch electrodes disposed in the valid area so as not to overlap with the sensing electrode, thereby sensing a second input; first wirings disposed in the invalid area and connected to the sensing electrodes; and second wirings disposed in the invalid area and connected to the touch electrodes, wherein the touch electrodes are mesh form and disposed between the sensing electrodes, and each second wiring surrounds at least one sensing electrode and is electrically connected in a loop form.

8 Claims, 11 Drawing Sheets

(51) Int. Cl.
  *G02F 1/1343*    (2006.01)
  *G06F 3/0354*    (2013.01)
  *G06F 3/047*     (2006.01)

(52) U.S. Cl.
  CPC .............. *G06F 3/044* (2013.01); *G06F 3/047*
    (2013.01); *G06F 2203/04102* (2013.01); *G06F 2203/04112* (2013.01)

(56) References Cited

U.S. PATENT DOCUMENTS

2013/0234974  A1    9/2013  Guard
2016/0124562  A1*   5/2016  Lu .......................... G06F 3/0412
                                                       345/174
2017/0123569  A1*   5/2017  Kim ........................ G06F 3/044

FOREIGN PATENT DOCUMENTS

KR    10-2014-0003310    1/2014
KR    10-2014-0023045    2/2014
KR    10-2014-0104449    8/2014
KR    10-2014-0107142    9/2014

* cited by examiner

TOUCH PANEL

This application is a U.S. National Stage Application under 35 U.S.C. § 371 of PCT Application No. PCT/KR2015/014298, filed Dec. 28, 2015, which claims priority to Korean Patent Application No. 10-2014-0193807, filed Dec. 30, 2014, whose entire disclosures are hereby incorporated by reference.

TECHNICAL FIELD

The present invention relates to a touch panel and, more particularly, to a structure for improving the yield and performance of a touch panel.

BACKGROUND ART

Recently, a touch panel for performing input by touching an input device, such as a finger or stylus, on an image displayed on a display device is being applied to various electronic products, such as a mobile terminal.

The touch panel may be representatively divided into a touch panel of a resistive film method and a touch panel of a capacitive method. The touch panel of the resistive film method detects a location by sensing a change in resistance depending on connection between electrodes when pressure is applied to the input device. The touch panel of the capacitive method detects a location a change in capacitance between electrodes when a finger is touched. In a small-sided model, the capacitive method has recently been in the spotlight for reasons, such as manufacture convenience and sensing power.

In general, the front part of the touch panel is divided into a view area in which a user's touch command is recognized and a non-view area in which a touch command is not recognized. A bezel belongs to the non-view area.

The touch panel includes a substrate having the view area and the non-view area. A transparent electrode which senses input means is formed in the view area. Wirings, printed layers, etc. are disposed in the non-view area.

The aforementioned capacitive method includes two capacitive sensing layers. The two capacitive sensing layers are made of an insulating material with a space interposed therebetween in order to obtain a capacitive effect between the sensing layers.

Meanwhile, a configuration for recognizing a touch using a stylus pen in addition to a finger may also be included in the touch panel. In this case, a configuration for recognizing a touch of a stylus pen and a configuration for recognizing a touch of a finger may sense touches in different ways.

DISCLOSURE

Technical Problem

An object of the present invention is to prevent a manufacturing defect in a touch panel capable of sensing a touch by a finger and a touch by a stylus and the yield of the touch panel.

Meanwhile, an object of the present invention is to improve the visibility of a touch panel.

Technical Solution

A touch panel of the present invention for achieving the objects includes a substrate which is divided into a view area and a non-view area, sensing electrodes which are disposed in the view area and senses first input, touch electrodes which are disposed to not overlap the sensing electrodes in the view area and senses second input, first wirings which are disposed in the non-view area and connected to the sensing electrodes, and second wirings which are disposed in the non-view area and connected to the touch electrode, wherein the touch electrode is a mesh form.

In this case, a mesh line formed from the boundary of the touch electrode on one side to the boundary of the touch electrode on the other side may include a node. The number of nodes may be 3 or more to 10 or less. The node includes a contact point at the boundary of the mesh line and the touch panel. Meanwhile, in an embodiment of the present invention, the distance between the nodes may be 200 to 600 um.

In a touch panel according to another embodiment of the present invention, a plurality of touch electrodes may be disposed between adjacent sensing electrodes in the view area. Specifically, two touch electrodes may be disposed between adjacent sensing electrodes in the view area. In this case, a mesh line formed from the boundary of each of two electrodes disposed between adjacent sensing electrodes on one side to the boundary of each of the two electrodes on the other side may include at least three nodes.

Meanwhile, in a touch panel according to another embodiment of the present invention, a sensing electrode may also be formed in a mesh form. The opening ratio of the mesh form of the touch electrode may be 0.8 times to 1.2 times the opening ratio of the mesh form of the sensing electrode. The sensing electrode and the touch electrode may be formed in the same layer in the view area.

Advantageous Effects

In accordance with the present invention, the visibility of a touch panel capable of sensing two types of touch input can be improved. Furthermore, the defect of a touch panel can be prevented and the yield can be improved.

MODE FOR INVENTION

Figure 1:
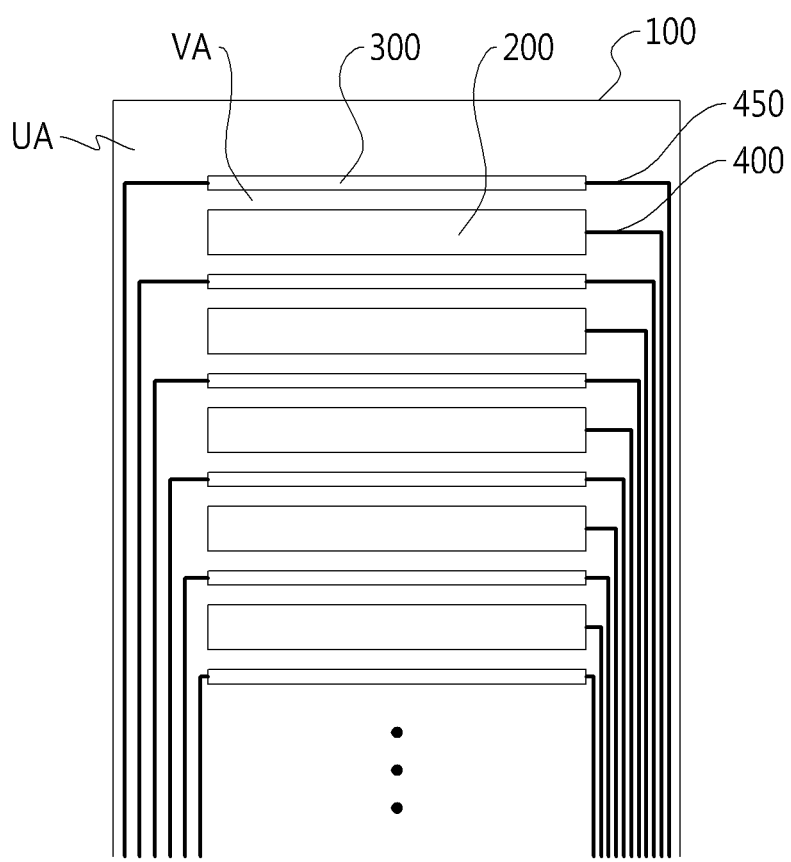
FIG. 1 is a plan view showing a touch panel according to an embodiment of the present invention.

Hereinafter, a touch panel according to the present invention is described in detail with reference to the accompanying drawings. Embodiments to be described hereunder are provided in order for those skilled in the art to easily understand the technological spirit of the present invention, and the present invention is not restricted by the embodiments. Furthermore, contents expressed in the accompanying drawings have been diagrammed to easily describe the embodiments of the present invention, and may be different from those that are actually implemented.

Meanwhile, an expression that some elements are "included" is an expression of an "open type", and the expression simply denotes that the corresponding elements are present, but should not be construed as excluding additional elements.

Furthermore, expressions, such as "the first" and "the second", are used to only distinguish a plurality of elements from one another and do not limit the sequence or other characteristics of the elements.

A touch panel according to an embodiment of the present invention includes a substrate which is divided into a view area and a non-view area, sensing electrodes which are disposed in the view area and senses first input, touch electrodes which are disposed to not overlap the sensing electrode in the view area and senses second input, first wirings which are disposed in the non-view area and connected to the sensing electrode, and second wirings which are disposed in the non-view area and connected to the touch electrode. The touch electrode has a mesh form.

The touch panel includes a substrate in which a view area VA in which the location of an input device (for example, a finger or a stylus pen) is sensed and a non-view area UA disposed around the view area VA have been defined.

In this case, a transparent electrode may be formed in the view area VA so that an input device can be sensed. For example, a sensing electrode and a touch electrode may be formed. Furthermore, wirings electrically connecting the transparent electrodes may be formed in the non-view area UA. Furthermore, an external circuit connected to the wirings may be located in the non-view area UA.

When the input device touches the touch panel, a difference in capacitance or EMR is generated from a portion touched by the input device. The portion from which such a difference was generated is detected as a contact location.

Such a touch panel is described in more detail below.

The substrate supports sensing electrodes, insulating layers, wirings and circuit substrates provided on the substrate. The substrate may be made of various materials. For example, the substrate may be formed of a glass substrate or a plastic substrate.

The substrate includes the view area VA and the non-view area UA surrounding the view area. A printed layer may be formed in the non-view area UA of the substrate. The printed layer may be formed by coating materials having specific color so that a wire and a printed circuit board connecting the wiring to an external circuit are not seen from the outside. The printed layer may have color suitable for a required external appearance. For example, the printed layer may include a black pigment or a white pigment to show black or white. Furthermore, a required logo may be formed in the printed layer in various ways. That is, a color printed layer may be formed on the substrate in the non-view area UA using a black pigment or a white pigment. In this case, a white layer may be formed if the white pigment is used, and a black layer may be formed if the black pigment is used. In this case, the white pigment includes a transparent pigment.

The sensing electrode may include a transparent conductive material so that it allows electricity to flow therethrough while not hindering the transmission of light. The sensing electrode is disposed in the view area of the substrate. For example, the sensing electrode may include metal oxide, such as indium tin oxide, indium zinc oxide, copper oxide, tin oxide, zinc oxide or titanium oxide. Alternatively, the sensing electrode may include a nanowire, a photosensitive nanowire film, carbon nanotube (CNT), graphene or conductive polymer. Alternatively, the sensing electrode may include may include various types of metal. For example, the sensing electrode may include at least one of types of metal, such as chrome (Cr), nickel (Ni), copper (Cu), aluminum (Al), silver (Ag), molybdenum (Mo), gold (Au), titanium (Ti) and an alloy of them. Furthermore, the sensing electrode may include metal having excellent electrical conductivity. The sensing electrode detects a touch location by sensing a difference in capacitance which is generated when a user applies input to the touch panel.

The touch electrode is an element for sensing input by a stylus pen. More specifically, the touch electrode senses touch input using a change in electromagnetism, which is generated when a stylus pen approaches or touches the touch electrode of the touch panel based on an electromagnetic induction method. Furthermore, the touch electrode may sense a location using the intensity or change of an electric field, which is generated by a stylus pen. The touch electrode may be formed using materials having a transparent property and may be formed using conductive materials capable of forming an electric field or generating electromagnetic induction. The touch electrode may be implemented by a configuration which allows electricity to flow therethrough while not hindering light transmission and has an electric field varying when a stylus pen, etc. approaches. The touch electrode is disposed in the view area of the substrate, and may include metal oxide, such as indium tin oxide, indium zinc oxide, copper oxide, tin oxide, zinc oxide or titanium oxide like the sensing electrode. Alternatively, the touch electrode may include a nanowire, a photosensitive nanowire film, carbon nanotube (CNT), graphene or conductive polymer. Alternatively, the touch electrode may include various types of metal. For example, the sensing electrode may include at least one of types of metal, such as chrome (Cr), nickel (Ni), copper (Cu), aluminum (Al), silver (Ag), molybdenum (Mo), gold (Au), titanium (Ti) and an alloy of them. Furthermore, the sensing electrode may include metal having excellent electrical conductivity. The touch electrode may sense second input. The second input includes input generated as an electric field is changed by a stylus pen, for example.

The wiring is disposed in the non-view area of the substrate, and is an element, that is, a medium for sending an electric signal sensed by the sensing electrode and an electric signal sensed by the touch electrode to the driver IC, etc. of the touch panel. A wire electrode may include metal having excellent electrical conductivity. For example, the wire electrode may include metal oxide, such as indium tin oxide, indium zinc oxide, copper oxide, tin oxide, zinc oxide or titanium oxide, and may include a nanowire, a photosensitive nanowire film, carbon nanotube (CNT), graphene or conductive polymer. Furthermore, the wire electrode may include various types of metal. For example, the wire electrode may include at least one of types of metal, such as chrome (Cr), nickel (Ni), copper (Cu), aluminum (Al), silver (Ag), molybdenum (Mo), gold (Au), titanium (Ti) and an alloy of them. The wiring electrode may be disposed over the printed layer in the non-view area of the substrate.

In order to help understanding of the present invention, a touch panel according to an embodiment of the present invention is described below with reference to the drawings.

FIG. 1 is a plan view showing a touch panel according to an embodiment of the present invention. The substrate 100, the sensing electrode 200, the touch electrode 300, the first wire 400 and the second wire 450 described above are shown in FIG. 1. Referring to FIG. 1, the sensing electrode 200 and the touch electrode 300 have been alternately disposed in the view area of the substrate 100. The first wire 400 connected to the sensing electrode 200 and the second wire 450 connected to the touch electrode 300 have been disposed in the non-view area. Meanwhile, FIG. 1 is a plan view of the touch panel and illustrates the sensing electrode 200, the touch electrode 300 and the first and the second wires as if they have been directly formed in the substrate 100. Practically, the sensing electrode 200 and the touch electrode 300 may be directly formed in the substrate 100 and may be attached to the substrate 100 by an adhesive layer after they are formed in separate electrode forming layers. Such various structures are described later.

Figure 2:
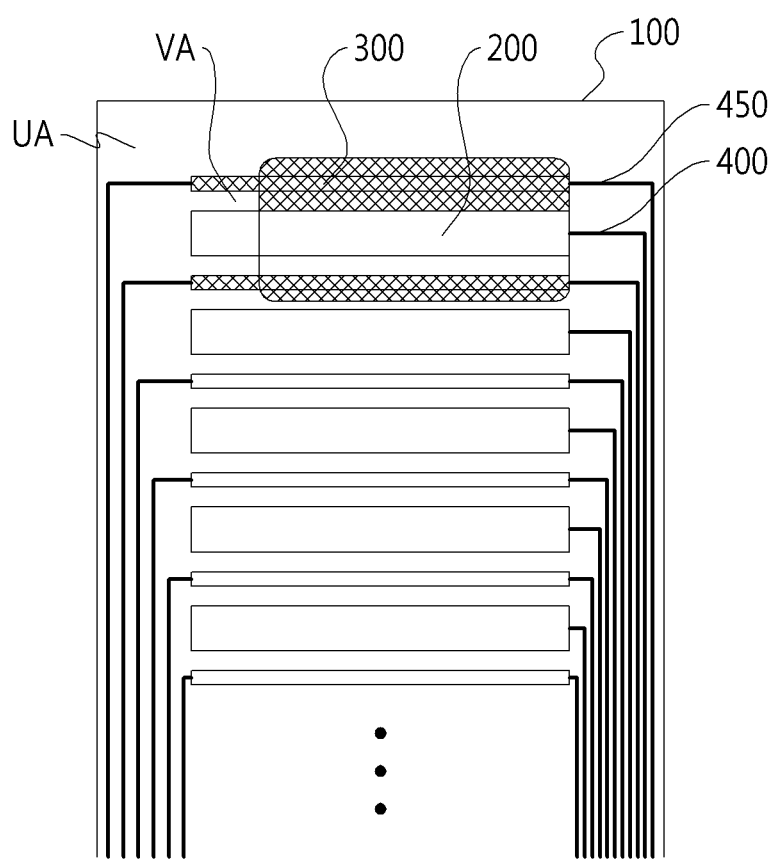
FIG. 2 is a plan view showing an enlarged view of the view part of the touch panel according to an embodiment of the present invention.

In the present invention, the touch electrode 300 is a mesh form. This is described with reference to FIG. 2. FIG. 2 is a plan view showing an enlarged view of the view part of the touch panel according to an embodiment of the present invention. Referring to FIG. 2, it may be seen that the touch electrode 300 shown in FIG. 1 has been actually implemented in a mesh form. In the present invention, the touch electrode 300 is formed in a mesh form in order to improve the electrical conduction characteristics of the touch electrode 300 and also to improve the visibility of the touch panel. The touch electrode 300 is made of a transparent material, but an area over the substrate 100 in which the touch electrode 300 and the sensing electrode 200 have been disposed and an area over the substrate 100 in which the touch electrode 300 and the sensing electrode 200 have not been disposed may be different in light transmittance. Accordingly, the touch electrode 300 is formed in a mesh form in order for the touch electrode 300 or the sensing electrode 200 to smoothly perform the sensing of a signal and the transmission of an electric signal, that is, its natural functions, and in order to improve the visibility of the touch panel.

As a result, light generated by a display panel under the touch panel can be smoothly viewed by a user through the touch panel of a mesh form and also an electrical conduction characteristic can be maintained.

In an embodiment in which the mesh structure is formed, an electrode of a mesh form may be formed by disposing a metal layer on the front of the substrate 100 and etching the metal layer in a mesh form. For example, an embossed copper metal mesh electrode of a mesh form may be formed by depositing a metal layer, such as copper, on the front of the substrate 100, such as polyethylene terephthalate, and etching the copper layer.

Alternatively, a resin layer including a UV resin or thermosetting resin layer may be formed on the substrate 100. After an engraved or embossed nano pattern and micro pattern of a mesh form is formed in the resin layer, at least one of types of metal, such as Cr, Ni, Cu, Al, Ag, Mo, Au, Ti and an alloy of them may be sputtered on the resin layer. In this case, the embossed pattern of the nano pattern and the micro pattern may be formed by imprinting a mold having an engraved pattern, and the engraved pattern may be formed by imprinting a mold having an embossed pattern. Next, the metal layer formed on the nano pattern and the micro pattern is etched so that only the metal layer formed on the nano pattern is removed and only the metal layer formed on the micro pattern remains intact, thereby being capable of forming the metal electrode of a mesh form. In this case, when the metal layer is etched, an etch rate may be different depending on a difference between the junction area of the nano pattern and the metal layer and the junction area of the micro pattern and the metal layer. That is, since the junction area of the micro pattern and the metal layer is greater than the junction area of the nano pattern and the metal layer, the etching of electrode materials formed on the micro pattern is less generated, the metal layer formed on the micro pattern remains intact at the same etching rate, and the metal layer formed on the nano pattern is removed by etching. Accordingly, the metal electrode of an embossed mesh form of the micro pattern may be formed on the substrate 100.

In another embodiment, after a resin layer including a UV resin or thermosetting resin layer is formed on the substrate 100, an engraved pattern of a mesh form may be formed on the resin layer and the engraved pattern may be filled with a metal paste. In this case, the engraved pattern of the resin layer may be formed by imprinting a mold having an embossed pattern. The metal paste may be metal including at least one pieces of metal, such as Cr, Ni, Cu, Al, Ag, Mo and an alloy of them. Accordingly, the engraved pattern of the mesh form may be filled with metal to form the metal mesh electrode of an engraved mesh form. In a method for forming the metal, the metal may be formed by filling a metal paste or using plating.

The touch electrode may include mesh lines LA and a mesh opening OA between the mesh lines LA by a plurality of sub-electrodes that cross each other in a mesh form. This may be seen through FIG. 4.

The line width of the mesh line LA may be about 0.1 μm to about 10 μm. A mesh line unit in which the line width of the mesh line LA is less than about 0.1 μm is impossible in terms of a manufacturing process and may generate short-circuiting in a mesh line. If the line width of the mesh line LA exceeds about μm, visibility may be deteriorated because an electrode pattern is viewed to the outside. Preferably, the line width of the mesh line LA may be about 0.5 μm to about 7 μm. More preferably, the line width of the mesh line may be about 1 μm to about 3.5 μm.

Furthermore, the mesh opening may be formed in various forms. For example, the mesh opening OA may have various shapes, such as a quadrangle, a diamond form, a pentagon, a polygon such as a hexagon or a. Furthermore, the mesh opening may be formed in a regular shape or a random shape.

In the present invention, the touch electrode can be flexibly formed compared to a conventional technology because the touch electrode is a mesh structure. That is, a touch panel to which a touch electrode of a mesh form, such as that of the present invention, has been applied can be easily applied to a wearable device, a vehicle or a mobile device having a curved display, for example, if the touch panel is applied to a curved surface, in particular.

In the touch electrode 300 according to an embodiment of the present invention, a mesh line 310 formed from the boundary of the touch electrode 300 on one side to the boundary of the touch electrode 300 on the other side includes at least three nodes. The present embodiment is for improving electrical conductivity of the touch electrode 300. If the mesh line 310 forming a mesh form includes three or more nodes, another path for the transmission of an electric signal can be secured although some mesh form is disconnected.

Figure 3:
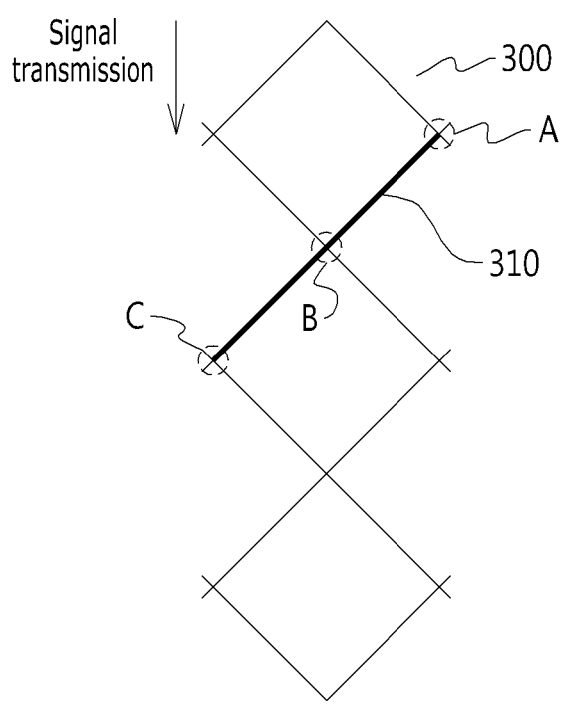
FIGS. 3 to 6 are plan views showing an enlarged view of a touch electrode of the touch panel according to an embodiment of the present invention.

This is described with reference to FIG. 3. FIG. 3 is an example in which three nodes are included in the mesh line 310 forming a mesh form of the touch electrode 300. In the example of FIG. 3, a node A, a node B and a node C are included in the mesh line 310. In the present invention, the node may include a crossing between the mesh lines 310 and a contact at the boundary of the mesh line 310 and the touch electrode 300. In FIG. 3, the node A and the node C are nodes formed at the boundary of the touch electrodes 300 and formed at the contact point of the mesh lines 310.

As in the present embodiment, if the mesh line 310 formed from the boundary of the touch electrode 300 on one side to the boundary of the touch electrode 300 on the other side includes at least three nodes, the touch electrode 300 can send a signal although some of the mesh lines 310 are disconnected. The mesh line 310 may have a possibility that it may be disconnected during several processes performed in a process of fabricating the touch panel and may be disconnected by an external impact. For example, if a touch panel is mounted on a touch device having a flexible structural characteristic, there is a good possibility that a mesh line may be disconnected if the touch panel (more specifically, a touch electrode) is repeatedly bent or the touch electrode is mounted on the touch device in the state in which it has been originally bent. If the mesh line 310 is disconnected as described above, a touch sensing signal according to the touch of a stylus pen cannot be transmitted along the touch electrode 300 through the disconnected mesh line 310. In an embodiment of the present invention, however, a signal can be transmitted through a mesh line 310, that is, another detour path, although some of the mesh lines 310 is disconnected due to three or more formed nodes. In the example of FIG. 3, although the mesh line 310 is disconnected between the node A and the node B, the signal of the touch electrode 300 can be transmitted through the mesh line 310 between the node B and the node C. That is, if each mesh line 310 formed from the boundary of the touch electrode 300 on one side to the boundary of the touch electrode 300 on the other side within the touch electrode 300 includes three or more nodes, the yield of a touch panel can be improved because a signal can be transmitted although some mesh lines 310 are disconnected.

Meanwhile, in an embodiment of the present invention, the number of nodes included in the mesh line 310 formed from the boundary of the touch electrode 300 on one side to the boundary of the touch electrode 300 on the other side may be 3 or more to 10 or less. From a viewpoint of signal transmission only, it is advantageous if the mesh line 310 includes many nodes. However, there is a problem in that the visibility of a touch panel is deteriorated as the number of mesh lines 310 increases and the number of nodes increases. For example, as the number of nodes increases, sensing performance of a sensing electrode may be deteriorated because the distance between the sensing electrodes is increased. Furthermore, each mesh line 310 needs to secure a specific width or more. As the number of nodes in the mesh line 310 increases, the width of the touch electrode 300 itself needs to be increased. This also causes to deteriorate the visibility of a touch panel.

Accordingly, in the present embodiment, three or more nodes are included in the mesh line 310 formed from the boundary of the touch electrode 300 on one side to the boundary of the touch electrode 300 on the other side, but 10 or less nodes are included in the mesh line 310. In the touch electrode 300 shown in FIG. 4, four nodes have been formed along the mesh line 310. The results of experiments showed that visibility quality of a touch panel was not affected if the number of nodes was 10 or less, but visibility was deteriorated if the number of nodes increased. More specifically, if the number of nodes of the mesh line 310 formed from the boundary of the touch electrode 300 on one side to the boundary of the touch electrode 300 on the other side was 4 or more to 8 or less, the visibility of a touch panel had not been affected and the electrical conductivity of the touch electrode 300 could be also improved. Electrical conductivity could be maintained although disconnection is generated in the mesh line 310 for several reasons.

Meanwhile, in an embodiment of the present invention, the distance between the nodes may be 200 to 600 um. If the distance between the nodes is smaller than 200 um, visibility may be reduced after the touch electrode 300 is coupled to the substrate 100. In FIGS. 1 and 2, the touch electrode 300 and the sensing electrode 200 have been illustrated as being disposed in a first direction. Practically, second-dimensional coordinates can be obtained only when the touch electrode 300 and the sensing electrode 200 are disposed in the touch panel in both directions of x and y. Accordingly, the finally completed touch panel includes the touch electrode 300 and the sensing electrode 200 longitudinally disposed in addition to the touch electrode 300 and the sensing electrode 200 shown in FIGS. 1 and 2. If the distance between the nodes of the touch electrode 300 and the sensing electrode 200 that overlap up and down is smaller than 200 um, the number of nodes within the touch electrode 300 is increased that much, which results in the deterioration of visibility. In contrast, if the distance between the nodes exceeds 600 um, the width of the touch electrode 300 itself needs to be increased in order to secure at least three nodes in the mesh line 310. In this case, there is a problem in that a total size of a touch panel is increased. Meanwhile, there is a problem in that touch sensing performance is reduced because the distance between the mesh lines 310 is too wide. Accordingly, in an embodiment of the present invention, the distance between nodes included in the mesh line 310 formed from the boundary of the touch electrode 300 on one side to the boundary of the touch electrode 300 on the other side is 200 um to 600 um. The results of experiments showed that an effect was further improved if the distance was 250 um to 550 um and the best effect was obtained if the distance was 300 um to 400 um, preferably.

Figure 4:
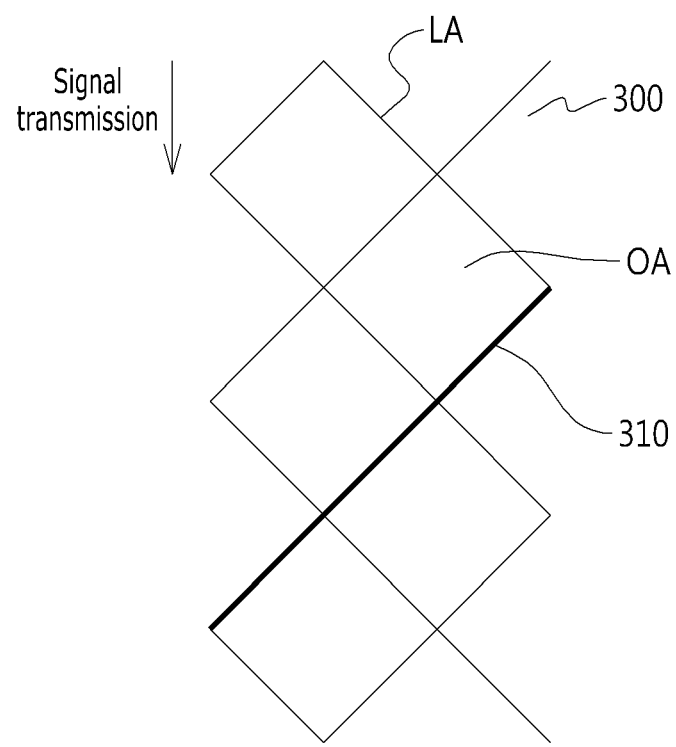
Figure 5:
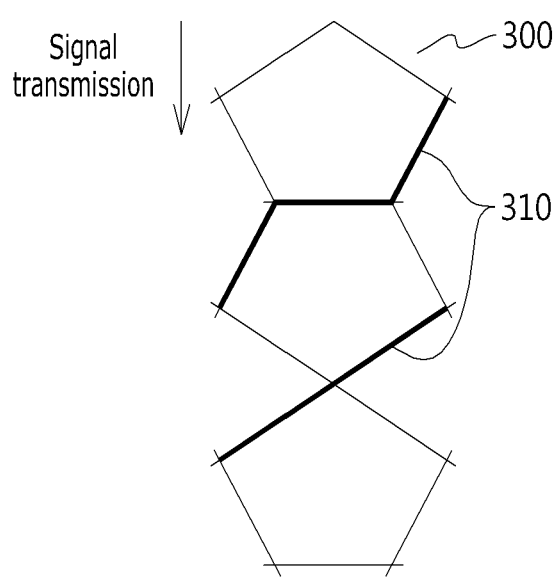
Figure 6:
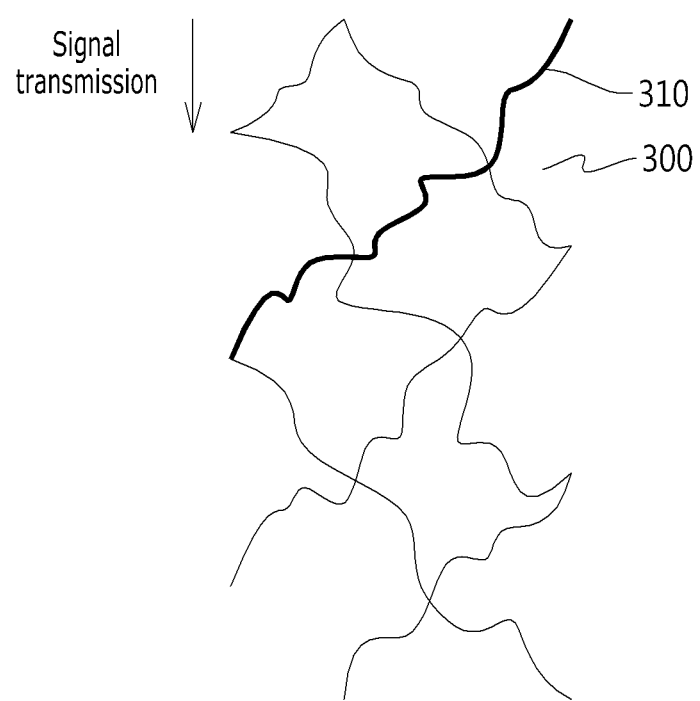

Meanwhile, FIGS. 3 and 4 show examples in which a mesh within the touch electrodes 300 has been formed in a regular quadrangle pattern, but the shape of the mesh is not limited thereto. As shown in FIG. 5, the mesh may be formed in a form in which polygons of various forms have been mixed. Furthermore, as shown in FIG. 6, the mesh line 310 may be formed in various random patterns. In this case, however, it is preferred that the mesh line 310 formed from the boundary of the touch electrode 300 on one side to the boundary of the touch electrode 300 on the other side includes at least three nodes.

Meanwhile, in an embodiment of the present invention, a plurality of the touch electrodes 300 may be disposed between adjacent sensing electrodes 200 in the view area of the substrate 100. More preferably, two touch electrodes 300 may be disposed between adjacent sensing electrodes 200. The present embodiment is described through FIG. 7.

Figure 7:
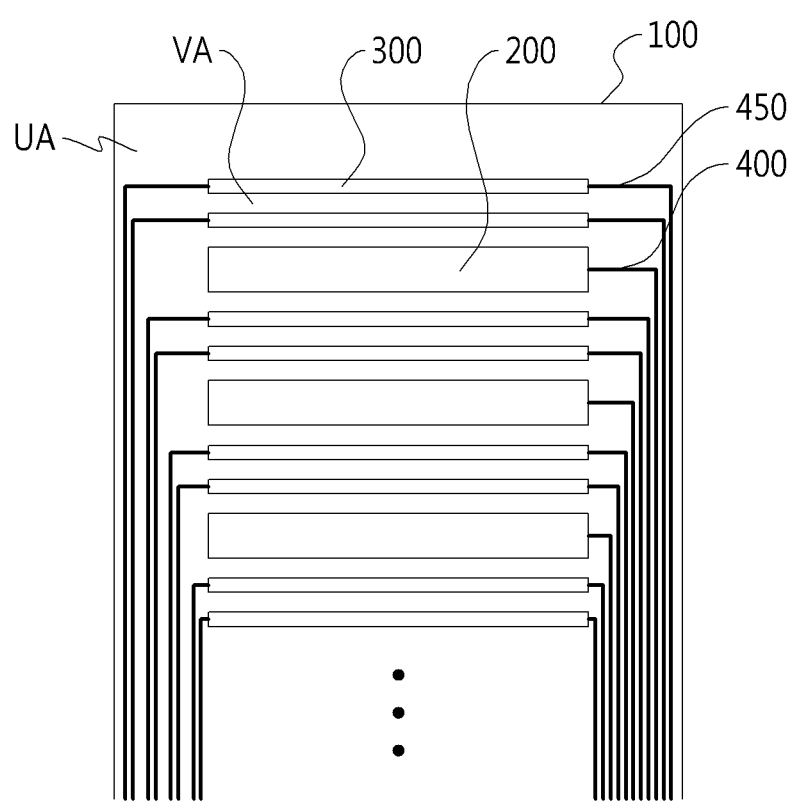
FIG. 7 is a plan view showing a touch panel according to another embodiment of the present invention.

FIG. 7 is a plan view showing a touch panel according to another embodiment of the present invention. FIG. 7 shows an example in which two touch electrodes 300 have been disposed between the sensing electrodes 200. In the present embodiment, the touch electrodes 300 may be electrically connected so that they form a loop surrounding one or a plurality of the sensing electrodes 200 interposed therebetween. In this case, two touch electrodes 300 may be disposed between adjacent sensing electrodes 200.

Meanwhile, in the two touch electrodes 300 disposed between the adjacent sensing electrodes 200, the mesh line 310 formed from the boundary of the touch electrode 300 on one side to the boundary of the touch electrode 300 on the other side may include at least three nodes. More preferably, the number of nodes formed in the mesh line 310 may be 3 or more to 5 or less. In this case, at least 6 nodes may be formed in all of the touch electrodes 300 disposed between the sensing electrode 200 and the sensing electrode 200. This may be included in the range of 3 or more to 1 or less which is proposed as an optimum range in the previous embodiment, more preferably, in the range of 4 or more to 8 or less.

In another embodiment of the present invention, in addition to the touch electrode 300, the sensing electrode 200 may also be formed in a mesh form. The mesh line 310 formed from the boundary of the sensing electrode 200 on one side to the boundary of the sensing electrode 200 on the other side may include at least three nodes.

In this case, a difference between the opening ratio of the touch electrode 300 having a mesh form and the opening ratio of the sensing electrode 200 having a mesh form may be about 20%. That is, the opening ratio of the mesh form of the touch electrode 300 may be 0.8 times to 1.2 times the opening ratio of the mesh form of the sensing electrode 200. This is associated with visibility. The opening ratio is related to the width of an area in which the mesh line 310 has been formed within the touch electrode 300. The touch electrode 300 and the sensing electrode 200 coexist in the view area of the touch panel. If the opening ratios of the touch electrode 300 and the sensing electrode 200 are different, light transmission of the mesh electrode and light transmission of the touch electrode 300 are different. As a result, light transmission is not generally regular in the view area of the touch panel. As a result, an area in which the touch panel is seen foggy is generated (this is called a milky phenomenon). In the present invention, in order to prevent the phenomenon, the opening ratio of the mesh form of the touch electrode 300 is set as 0.8 times to 1.2 times the opening ratio of the mesh form of the sensing electrode 200. In the present embodiment, the opening ratio of the touch electrode per unit area is preferably 0.8 times to 1.2 times the opening ratio of the sensing electrode. For example, in the case of FIG. 3, the unit area is a rectangular area assuming that the distance between the node A and the node C is length and breadth.

In another embodiment of the present invention, the sensing electrode 200 and the touch electrode 300 are disposed in the same layer of the view area. In a conventional technology, a layer in which the sensing electrode 200 is disposed and a layer in which the touch electrode 300 is disposed are separately included in a touch panel. In the present invention, the touch electrode 300 is also disposed in the layer in which the sensing electrode 200 is disposed, thereby being capable of reducing the number of electrode forming layers within the touch panel. Accordingly, the visibility of the touch panel can be improved.

Structures of the touch panel according to various embodiments of the present invention are described below. The sensing electrode 200 and touch electrode 300 of the present invention may be directly disposed on the substrate 100. After the sensing electrode 200 and touch electrode 300 are disposed in a separate electrode forming layer separately from the substrate 100, the electrode forming layer may be coupled to the substrate 100. The electrode forming layer and the substrate 100 may be coupled by an adhesive layer, for example. Furthermore, the touch electrode 300 and the sensing electrode 200 may be directly disposed in the substrate 100.

As described above, in the touch panel of the present invention, the touch electrode 300 and the sensing electrode 200 need to be disposed in the first and second directions in order to sense a two-dimensional touch location. In this case, the touch electrode 300 and the sensing electrode 200 in the first direction and the touch electrode 300 and the sensing electrode 200 in the second direction may be disposed in different electrode forming layers and coupled by an adhesive layer, etc. or may be disposed on both sides of a single electrode forming layer or may be directly disposed on both sides of the substrate 100.

Furthermore, both the touch electrode 300 and the sensing electrode 200 in the first and second directions may be disposed on one surface of the electrode forming layer. In this case, the touch electrode 300 and the sensing electrode 200 in the first direction and the touch electrode 300 and the sensing electrode 200 in the second direction need to be electrically insulated. Accordingly, the touch electrode 300 and the sensing electrode 200 in the first direction and the touch electrode 300 and the sensing electrode 200 in the second direction may be insulated and connected through the medium of an insulating layer and a bridge electrode and disposed in the first and second directions.

In another embodiment of the present invention, the first and the second wires may also be formed in a mesh form, thereby being capable of improving electrical conductivity.

Meanwhile, the structure of a touch display in which the touch panel according to another embodiment of the present invention has been formed is described.

In the present embodiment, the substrate 100 becomes a cover substrate, and the electrodes may be disposed in a display panel under the cover substrate. In this case, the touch electrode 300 and the sensing electrode 200 are not disposed in the substrate 100 or the electrode forming layer, but the electrodes may be disposed in the substrate included in the display panel.

For example, if the display panel is a liquid crystal display panel, a first substrate including a thin film transistor (TFT) and a pixel electrode and a second substrate including color filters are disposed in a structure in which the first substrate and the second substrate have coalesced with a liquid crystal layer interposed therebetween. In this case, the touch electrode 300 and the sensing electrode 200 may be disposed in the first substrate or the second substrate. As described above, the touch electrode 300 and the sensing electrode 200 formed in the same direction are disposed on the same substrate.

Meanwhile, the display panel may be a liquid crystal display panel of a color filter on transistor (COT) structure in which a thin film transistor, a color filter and a black matrix are formed in a first substrate and a second substrate coalesces to the first substrate with a liquid crystal layer interposed therebetween. That is, the thin film transistor may be formed on the first substrate, a protection film may be formed on the thin film transistor, and the color filter may be formed on the protection film. Furthermore, a pixel electrode that comes into contact with the thin film transistor is formed in the first substrate. In this case, in order to improve an opening ratio and to simplify a mask process, the black matrix may be omitted and a common electrode may be formed to also play the role of the black matrix.

Furthermore, if the display panel is a light-emitting diode (LED) display panel, the display device may further include a backlight unit which provides light at the back of the touch panel.

If the display panel is an organic light-emitting diode (OLED) display panel, the display panel includes a self-emissive element that does not require a separate light source. In the display panel, a thin film transistor is formed on a first substrate and an OLED element that comes into contact with the thin film transistor is formed. The OLED element may include a positive electrode, a negative electrode and an organic light-emitting layer formed between the positive electrode and the negative electrode. Furthermore, a second substrate that plays the role of a sealing substrate for encapsulation may be further included on the organic light-emitting layer. The touch electrode 300 and the sensing electrode 200 may be disposed in the first substrate and the second substrate.

Meanwhile, if the touch electrode 300 and the sensing electrode 200 are disposed in the first and the second substrates, the touch electrode 300 and the sensing electrode 200 may be disposed on the top and bottom surfaces of the first and the second substrates. For example, if the first substrate is located on the upper side and the second substrate is located on the lower side, the touch electrode 300 and the sensing electrode 200 may be disposed on the top surface of the first substrate or on the bottom surface of the second substrate. Furthermore, polarization plates may be respectively coupled to the top or bottom surfaces of the first and the second substrates. In this case, the touch electrode 300 and the sensing electrode 200 may be disposed in the polarization plate. For example, if the first substrate is located on the upper side, the second substrate 100 is located on the lower side, and first and second polarization plates are formed on surfaces that respectively face the upper/lower sides of the first and the second substrates, the touch electrode 300 and the sensing electrode 200 may be formed under the first polarization plate or over the first polarization plate. That is, the touch electrode 300 and the sensing electrode 200 may be formed on a surface of the polarization plate in which the polarization plate faces the first and the second substrates.

A touch display of a different form to which the touch panel of the present invention has been applied is described below.

Unlike in the aforementioned embodiments, in the touch panel according to an embodiment of the present invention, the touch electrode 300 and the sensing electrode 200 may be formed between the first and the second substrates 100 that form a display panel. If the first substrate of the display panel is formed on the upper side and the second substrate is formed on the lower side, the touch electrode 300 and the sensing electrode 200 may be formed on the bottom surface of the first substrate or the top surface of the second substrate. In this case, the substrate 100 becomes a cover substrate.

FIGS. 8 to 11 are diagrams showing examples in which touch panels according to various embodiments of the present invention have been applied.

Figure 8:
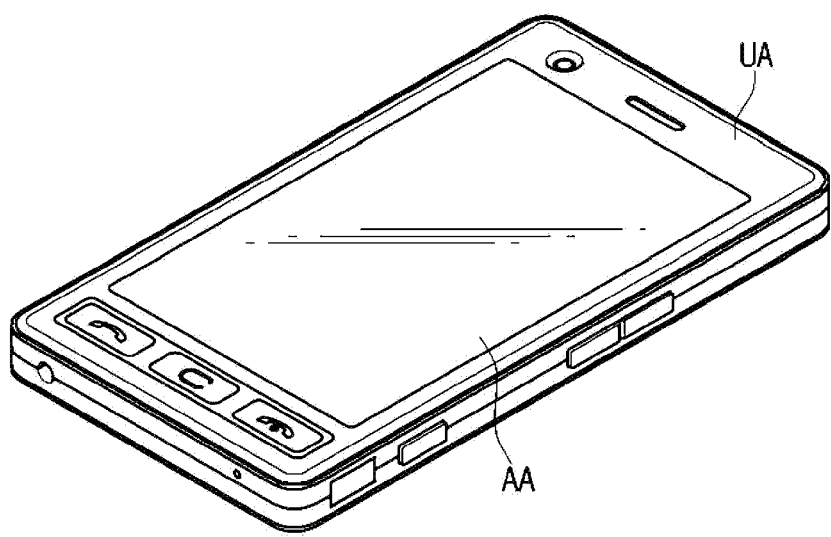
FIGS. 8 to 11 are diagrams showing examples in which touch panels according to various embodiments of the present invention have been applied.

FIG. 8 shows an example in which the touch panel of the present invention has been applied to a mobile device. The aforementioned touch panel may be applied to the display portion of a mobile device.

Figure 9:
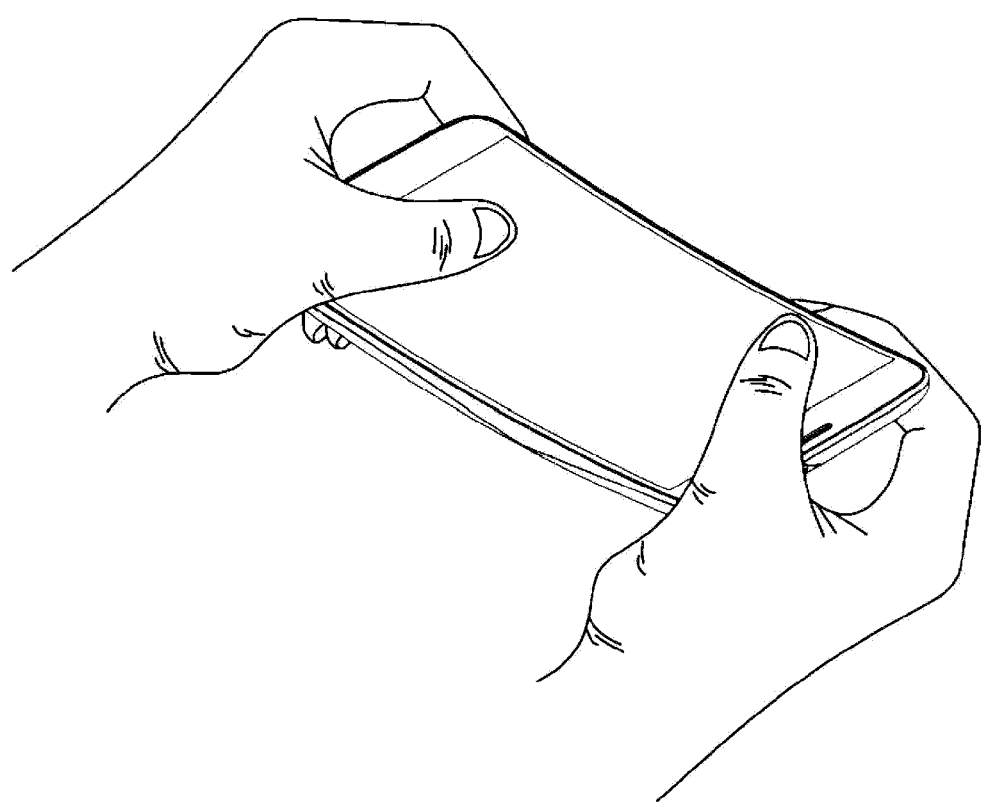

FIG. 9 shows a mobile device that belongs to mobile devices and that has a curved display. In the present embodiment, a substrate partially has a curved surface and a curved touch panel has been applied. For example, the touch panel may be a touch panel of a form in which the substrate has been bent while partially having a plane and partially having a curved surface. Specifically, the end of the substrate may be curved while having a curved surface or may be curved while having a surface including random curvature. Alternatively, the substrate itself may be a flexible substrate having a flexible characteristic. In addition, the substrate may be a curved or bended substrate. That is, the touch panel including the substrate may also be formed to have a flexible, curved or bended characteristic. Accordingly, a mobile device to which the touch panel according to an embodiment has been applied can be easily carried and can be changed in various designs.

Figure 10:
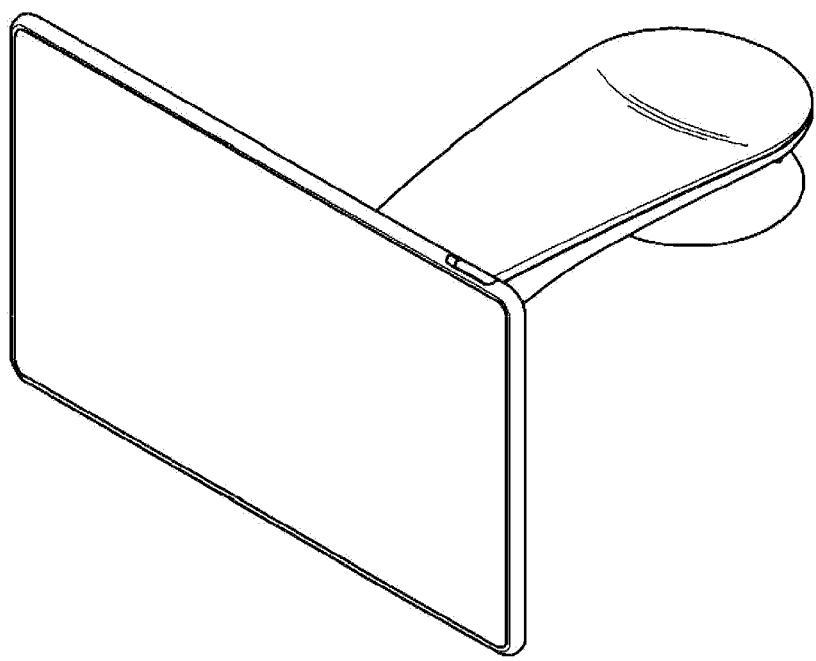

FIG. 10 shows that the touch panel according to an embodiment of the present invention has been formed in such a way as to be attached to or detached from another device by connection means. For example, the touch panel of the present invention may be applied to a navigator for vehicle and may be attached to or detached from a vehicle.

Figure 11:

FIG. 11 is an example in which a display for vehicle has been implemented through the touch panel according to an embodiment of the present invention. A dashboard and a front manipulation unit in a vehicle may be implemented by the aforementioned touch panel.

Although the present invention has been described as described above, a person having ordinary skill in the art to which the present invention pertains will recognize that the present invention may be implemented in other forms without departing from the technological spirit and essential characteristic of the present invention.

Accordingly, the aforementioned embodiments are merely illustrative and are not intended to restrict the scope of the present invention to the aforementioned embodiments only.

The scope of the present invention will be defined by the claims, but a configuration directly derived from the writing of the claims and all of changes or modified forms derived from an equivalent configuration thereof should be construed as belonging to the range of right of the present invention.

What is claimed is:

1. A touch panel, comprising:
   a substrate which is divided into a view area and a non-view area;
   sensing electrodes which are disposed in the view area and sense a first input;
   touch electrodes which are disposed to not overlap the sensing electrodes in the view area and sense a second input;
   first wirings which are disposed in the non-view area and connected to one end of the sensing electrodes; and
   second wirings which are disposed in the non-view area and connected to both ends of the touch electrodes,
   wherein the touch electrodes have a mesh form and are disposed between the sensing electrodes, and
   each second wiring surrounds at least one sensing electrode and is electrically connected in a loop form, and
   wherein the sensing electrode has a mesh form, and
   an opening ratio of the mesh form of the touch electrode is 0.8 to less than 1 times and greater than 1 to 1.2 times an opening ratio of the mesh form of the sensing electrode.

2. The touch panel of claim 1, wherein in a mesh line formed from a boundary of the touch electrode on one side to a boundary of the touch electrode on the other side, a number of nodes is 3 or more to 10 or less.

3. The touch panel of claim 2, wherein the nodes comprise a contact point at a boundary of the mesh line and the touch panel.

4. The touch panel of claim 2, wherein a distance between the nodes is 200 to 600 um.

5. The touch panel of claim 1, wherein in the view area, a plurality of touch electrodes is disposed between adjacent sensing electrodes.

6. The touch panel of claim 5, wherein in the view area, two touch electrodes are disposed between adjacent sensing electrodes.

7. The touch panel of claim 6, wherein a mesh line formed from a boundary of each of two electrodes disposed between adjacent sensing electrodes on one side to a boundary of each of the two electrodes on the other side comprises at least three nodes.

8. The touch panel of claim 1, wherein the sensing electrodes and the touch electrodes are disposed in an identical layer in the view area.

* * * * *